US006654710B1

(12) United States Patent
Keller (10) Patent No.: US 6,654,710 B1
(45) Date of Patent: Nov. 25, 2003

(54) METHOD FOR DESIGNING A FLOW DEVICE

(75) Inventor: Jakob Keller, deceased, late of Wohlen (CH), by George B. Keller, Vera E. Keller, Maria A. Keller-Schärli, administrators (73) Assignee: Alstom, Paris (FR)

( * ) Notice: Subject to any disclaimer, the term of this patent is extended or adjusted under 35 U.S.C. 154(b) by 0 days.

(21) Appl. No.: 09/325,558

(22) Filed: Jun. 4, 1999

(30) Foreign Application Priority Data

Jun. 4, 1998 (EP) .............................................. 98810512

(51) Int. Cl.$^7$ .......................... G06G 7/48; G06G 7/50; G06F 17/50
(52) U.S. Cl. ............................................... 703/9; 703/1
(58) Field of Search .......................................... 703/1, 9

(56) References Cited

U.S. PATENT DOCUMENTS 5,685,696 A * 11/1997 Zangeneh et al. ...... 416/186 R

FOREIGN PATENT DOCUMENTS

| EP | 0 962 874 A1 | 12/1999 |
| WO | WO95/18419 | 7/1995 |

OTHER PUBLICATIONS

Vasin, "The inverse problem of selecting a linearization coefficient for the Navier–Stokes equations with integral overdetermination"; Comp. Math. and Math. Physics; vol. 36, 1996, pp. 491–499.*

M.B. Giles and M. Drela, "Two–Dimensional Transonic Aerodynamic Design Method", AIAA Journal vol. 25, No. 9, Sep. 1987, pp. 1199–1206.

R. Courand and K. O. Friedrichs, Supersonic flow and shock waves, Interscience, New York (1967) Table of contents only.

J.J. Ke;;er. A pair of stream functions for three dimensional vortex flows, Z. agnew, Math Phys. 47 (1996). 821.

A. Jameson, N.A. Pierce and L. Martinello, Optimum aerodynamic design using the Navier–Stokes equations, AIAA paper 97–0101, 35th Aerispace Sciences Meeting, Reno, Nevada 1997.

Dand and V. Isgro, Inverse method for turbomachine blades using existing time–marching techniques, ASME paper 94–GT–20, International Gas Turbine and Aeroengine Congress, The Hague, Netherlands, 1994.

G.S. Dulikravich, Shape inverse design and optimization for three–dimensional aerodynamics, AIAA paper 95–0695, 33rd Aerospace Science Meeting, Reno, Nevada, 1995.

M. J. Pandya and O. Baysal, Gradient–based aerodynamic shape optimization using ADI method for large scale problem, AIAA paper 96–0091, 34th Aerospace Sciences Meeting, Reno, Nevada, 1996.

(List continued on next page.)

*Primary Examiner*—Hugh M. Jones
(74) *Attorney, Agent, or Firm*—Burns, Doane, Swecker & Mathis, L.L.P.

(57) ABSTRACT

A method for designing a flow device, including the steps of defining the physical properties of the flow device, and deriving from the physical properties the corresponding geometry of the flow device using inverse flow equations. The flow device can be at least a part of a gas turbine, a steam turbine, or a combined gas/steam turbine-cycle plant.

4 Claims, 4 Drawing Sheets

OTHER PUBLICATIONS

I. K. Jennions, The role of CFD in the design process, AGARD Paper, 7 Rue Ancelle, 92200 Neuilly sur Seine, France, Lecture Series 195, May to Jun. 1994.

M. G. Turner and M. B. Giles, Design and analysis of internal flow fields using a two stream function formulation, ASME Winter Annual Meeting 1990, FED vol. 103, 203.

J. J. Keller, W. Egli, and J. Exley, Force–and loss–free transitions between flow states, Z. angew, Math Phys. 36 (1985), 854.

J.J. Keller, On the interpretation of vortex breakdown, Phys Fluids 7 (7), (1995), 1696.

J.J. Keller et al., Vortex Breakdown as a fundamental element of vortex dynamics, Journal of Applied Mathematics and Physics, vol. 39, pp. 404–440, May 1988.

S.J. Kline, et al., Optimum Design of Straight–Walled Diffusers, Journal of Basic Engineering, Sep. 1959, pp. 321–331.

"Inverse Euler Equations", Keller, Math. Phys. 49 (1998), pp. 363–383.

"Inverse Method for Turbomachine Blades using Existing Time–Marching Techniques", Dang, et al., ASME presentation, Jun. 1994.

"Optimum Aerodynamic Design using the Navier–Stokes Equations", Jameson, et al., AIAA Inc. publication, pp. 1–21.

* cited by examiner

METHOD FOR DESIGNING A FLOW DEVICE

FIELD OF THE INVENTION

The present invention relates a method for designing a flow device.

PRIOR ART

The documents cited in the References section of the present application describe related technologies.

1. Introduction and Discussion of Background

The present invention is related to the design and construction of flow devices and especially turbine and compressor blade channels.

In recent years substantial efforts have been made to introduce inverse design tools for airfoil, turbine blades and vane channel, and other flow devices for which the optimum combination of aerodynamic forces and losses plays a crucial role. For an adequate overview of the state of the art the reader is referred to work by Jameson et al. [3], Giles and Drela [4], Dang and Isgro [5], Dulikravich [6], Pandya and Baysal [7]. An overview of applications to current turbomachinery design is given by Jennions [8].

It should be understood that this list of publications on inverse design methods is far from complete. Furthermore, it should be mentioned that formulations of the Euler equations using two stream functions have been previously used (see Turner and Giles [9], for example). However, with the exception of genuine inverse methods (Keller et al. [10], [11]) that have been proposed for certain two-dimensional flows, the "inverse methods" that are presently used to arrive at an optimum design of three-dimensional flow devices are not really inverse. In general "Evolution Strategy", genetic algorithms or simply Newton's method are used to guide an extensive series of flow calculations for gradually varying geometry toward some kind of optimum.

SUMMARY OF THE INVENTION

According to certain aspects of the present invention, a method for designing a flow device comprises the steps of (1) defining the physical properties of said flow device, and (2) deriving from said physical properties the corresponding geometry of said flow device by means of inverse flow equations.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments thereof, given only by way of example, and with reference to the accompanying drawings, in which.

DETAILED DESCRIPTION OF EXEMPLARY EMBODIMENTS

Referring to the drawing figures, like reference numerals designate identical or corresponding elements throughout the several figures.

The key advantage of using inverse equations instead, is associated with the fact that the geometry of a flow device does not have to be defined in advance. As an alternative it is possible to impose the distribution of static pressure, flow speed, temperature, heat flux or any other physical quantity, as a boundary condition and ask for the geometry (as a part of the solution) that generates the desired distribution of static pressure, etc. Furthermore, if the original domain of definition is simply connected, a one-to-one mapping into a cubic domain of definition with Cartesian coordinates can be achieved. As a consequence, the generally tedious task of grid generation for numerical calculations can be avoided.

2. Stream Functions and Natural Coordinate

To define boundary conditions and to embed boundary layers in an inviscid bulk flow, for example, it may be useful to introduce the "natural coordinate" σ that is related to the arc lengths along stream lines. Following the ideas of Ref. [2] we introduce a pair of stream functions to define a vector potential for the velocity field. Without essential loss of generality we restrict our considerations to solenoidal vector fields for the mass flux. In order to extend the discussion presented in Ref. [2] to compressible flows the mass flux (rather than the velocity) needs to be related to the stream functions. Hence, introducing the two stream functions $\psi$ and $\chi$, we can write $$\rho \underline{u} = \text{grad}(\psi) \times \text{grad}(\chi), \tag{1}$$

where $\underline{u}$ is the velocity vector and $\rho$ the density. The natural coordinate can be defined by $$h\,\text{grad}(\sigma) = \frac{\text{grad}(\psi) \times \text{grad}(\chi)}{|\text{grad}(\psi) \times \text{grad}(\chi)|}. \tag{2}$$

where σ is the dimensionless natural coordinate and $h=h(\sigma, \psi, \chi)$ is a nonlinear stretching coefficient, such that $hd\sigma$ denotes the actual length increment along the streamlines. As usual the nonlinear stretching needs to be included, in order to reach compatibility between the orthogonality requirement (2) and the uniform definition of $hd\sigma$ as the length increment along the streamlines.

Furthermore, in inverse coordinates we can write $$\frac{\partial \underline{x}}{\partial \sigma} \cdot \frac{\partial \underline{x}}{\partial \sigma} = h^2, \underline{x} = \underline{x}(\sigma, \psi, \chi), \tag{3}$$

wherein $\underline{x}$ is the coordinate vector in the original space.

First we need to express the time-independent Euler equations in terms of the two stream functions $\psi$ and $\chi$.

3. The Governing Equations in a Rotating Frame of Reference

An area of major interest to use inverse equations is the design of optimized turbine and compressor blade channels. For this reason it seems to be appropriate to further extend the governing equations to rotating frames of reference. In a frame of reference rotating steadily at the angular velocity $\underline{\Omega}$ the Euler equation can be written in the form $$(u \cdot grad)u + \frac{1}{\rho} grad\, p = -2\Omega \times u - \Omega \times (\Omega \times x), \quad (4)$$

wherein P refers to the static pressure. The terms on the right-hand side of (4) contribute to the fictitious volume force. The first term accounts for the Coriolis force and the second for the centrifugal force. Making use of the identities $$(u \cdot grad)u = grad\left(\frac{1}{2}u \cdot u\right) - u \times \omega \quad (5)$$

and $$-\Omega \times (\Omega \times x) = grad\left(\frac{1}{2}[\Omega \times x] \cdot [\Omega \times x]\right), \quad (6)$$

where $\omega$ refers to the vorticity, $$\omega = rot(u) = rot\left(\frac{1}{\rho} grad(\psi) \times grad(\chi)\right) \quad (7)$$
$$= \frac{1}{\rho} rot(grad(\psi) \times grad(\chi)) + grad\left(\frac{1}{\rho}\right) \times [grad(\psi) \times grad(\chi)]$$

we can rewrite (4) as $$grad\left(\frac{1}{2}u \cdot u - \frac{1}{2}[\Omega \times x] \cdot [\Omega \times x]\right) - u \times [\omega + 2\Omega] + \frac{1}{\rho} grad\, p = 0. \quad (8)$$

The first law of thermodynamics can be expressed as $$Tds = c_v dT - \frac{p}{\rho}\frac{d\rho}{\rho}, \quad (9)$$

where T is the temperature, s denotes the entropy per unit mass and $c_v$ refers to the specific heat per unit mass at constant volume. The equation of state is $$\frac{p}{\rho} = (c_p - c_v)T, \quad (10)$$

and $c_p$ refers to the specific heat per unit mass at constant pressure. Combining (8), (9) and (10) yields $$grad\left(c_p T + \frac{1}{2}u \cdot u - \frac{1}{2}[\Omega \times x] \cdot [\Omega \times x]\right) - \quad (11)$$
$$u \times [\omega + 2\Omega] - T\, grad\, s = 0.$$

Introducing the total enthalpy $$H = c_p T + \frac{1}{2}u \cdot u - \frac{1}{2}[\Omega \times x] \cdot [\Omega \times x] \quad (12)$$

equation (11) can now be expressed in the form of Crocco's theorem in the rotating frame:

$$grad H - u \times [\omega + 2\Omega] - T grad\, s = 0. \quad (13)$$

By virtue of (1) the condition of mass conservation is identically satisfied. Moreover, noting that the validity of the Euler equations is restricted to adiabatic flows, it is obvious that the s is constant on streamlines. Hence, the entropy is an integral of motion (in any frame of reference), $$s = s(\psi, \chi) \Leftrightarrow u \cdot grad\, s = 0. \quad (14)$$

Furthermore, it is obvious that $$(u \times [\omega + 2\Omega]) \cdot u = 0. \quad (15)$$

By virtue of (14) and (15) the scalar product of the velocity vector with equation (13) yields $$u \cdot grad H = 0 \Leftrightarrow H = H(\psi, \chi) \quad (16)$$

This is Bernoulli's theorem in the rotating frame of reference. It shows that the total enthalpy in the rotating frame is an integral of motion. Making use of (1), (14) and (16) equation (13) can be rewritten as $$\left(\frac{\partial H}{\partial \psi} - T\frac{\partial s}{\partial \psi}\right) grad\, \psi + \left(\frac{\partial H}{\partial \chi} - T\frac{\partial s}{\partial \chi}\right) grad\, \chi - \quad (17)$$
$$\frac{1}{\rho}[grad\, \psi \times grad\, \chi] \times [\omega \times 2\Omega] = 0$$

Furthermore, using the identity $$-[grad\psi \times grad\chi] \times [\omega + 2\Omega] = ([\omega + 2\Omega] \cdot grad\chi) grad\psi - ([\omega + 2\Omega] \cdot grad\psi) grad\chi \quad (18)$$

the vector products of (17) with $grad\psi$ and $grad\chi$, respectively, lead to the following generalized Euler equations in terms of two stream functions $$\frac{\partial H}{\partial \psi} - T\frac{\partial s}{\partial \psi} + \frac{1}{\rho}[\omega + 2\Omega] \cdot grad\chi = 0 \quad (19)$$

and $$\frac{\partial H}{\partial \chi} - T\frac{\partial s}{\partial \chi} - \frac{1}{\rho}[\omega + 2\Omega] \cdot grad\, \psi = 0. \quad (20)$$

For the subsequent discussion it is useful to introduce the mixed product that is defined by $$\{abc\} = [a \times b] \cdot c \quad (21)$$

An aim of the present paper is to derive the inverse forms of Euler's equations, using the two stream functions $\psi$ and $\chi$ and the natural (streamline) coordinate $\sigma$ as independent variables.

4. Mapping to Inverse Coordinates

In this section we consider the mapping $$x \leftarrow \rightarrow (\sigma, \psi, \chi). \quad (22)$$

The derivatives in the two coordinate system are related by $$grad(\psi) \times grad(\chi) = \frac{1}{J}\frac{\partial x}{\partial \sigma}, \quad (23)$$

$$grad(\chi) \times grad(\sigma) = \frac{1}{J}\frac{\partial x}{\partial \psi},$$

$$grad(\sigma) \times grad(\psi) = \frac{1}{J}\frac{\partial x}{\partial \chi},$$

where the mixed product $$J = \left\{\frac{\partial x}{\partial \sigma} \frac{\partial x}{\partial \psi} \frac{\partial x}{\partial \chi}\right\} \quad (24)$$

may be interpreted as Jacobi's determinant. Moreover it can be shown that $$grad(\sigma) = \frac{1}{J}\left[\frac{\partial x}{\partial \psi}\right] \times \left[\frac{\partial x}{\partial \chi}\right], \quad (25)$$

$$grad(\psi) = \frac{1}{J}\left[\frac{\partial x}{\partial \chi}\right] \times \left[\frac{\partial x}{\partial \sigma}\right],$$

$$grad(\chi) = \frac{1}{J}\left[\frac{\partial x}{\partial \sigma}\right] \times \left[\frac{\partial x}{\partial \psi}\right].$$

For a function $f(\underline{x})=g(\sigma,\psi,\chi)$ the conversion of derivatives can be expressed as $$grad(f) = \frac{1}{J}\left\{\left(\left[\frac{\partial x}{\partial \psi}\right] \times \left[\frac{\partial x}{\partial \chi}\right]\right)\frac{\partial g}{\partial \sigma} + \left(\left[\frac{\partial x}{\partial \chi}\right] \times \left[\frac{\partial x}{\partial \sigma}\right]\right)\frac{\partial g}{\partial \psi} + \left(\left[\frac{\partial x}{\partial \sigma}\right] \times \left[\frac{\partial x}{\partial \psi}\right]\right)\frac{\partial g}{\partial \chi}\right\}, \quad (26)$$

and for a vector $\underline{a}(\underline{x})=\underline{b}(\sigma,\psi,\chi)$ we can write $$div(\underline{a}) = \frac{1}{J}\left(\left(\left[\frac{\partial x}{\partial \psi}\right] \times \left[\frac{\partial x}{\partial \chi}\right]\right) \cdot \frac{\partial b}{\partial \sigma} + \left(\left[\frac{\partial x}{\partial \chi}\right] \times \left[\frac{\partial x}{\partial \sigma}\right]\right) \cdot \frac{\partial b}{\partial \psi} + \left(\left[\frac{\partial x}{\partial \sigma}\right] \times \left[\frac{\partial x}{\partial \psi}\right]\right) \cdot \frac{\partial b}{\partial \chi}\right) \quad (27)$$

and $$rot(\underline{a}) = \frac{1}{J}\left(\left(\left[\frac{\partial x}{\partial \psi}\right] \times \left[\frac{\partial x}{\partial \chi}\right]\right) \times \frac{\partial b}{\partial \sigma} + \left(\left[\frac{\partial x}{\partial \chi}\right] \times \left[\frac{\partial x}{\partial \sigma}\right]\right) \times \frac{\partial b}{\partial \psi} + \left(\left[\frac{\partial x}{\partial \sigma}\right] \times \left[\frac{\partial x}{\partial \psi}\right]\right) \cdot \frac{\partial b}{\partial \chi}\right\}. \quad (28)$$

Using (25), (26) and (28) it may be shown that $$grad(\chi) \cdot rot(grad(\psi) \times grad(\chi)) = \quad (29)$$
$$\left[\frac{1}{J}\frac{\partial x}{\partial \psi}\right] \cdot \left(\frac{\partial}{\partial \sigma}\left[\frac{1}{J}\frac{\partial x}{\partial \sigma}\right]\right) - \left[\frac{1}{J}\frac{\partial x}{\partial \sigma}\right] \cdot \left(\frac{\partial}{\partial \psi}\left[\frac{1}{J}\frac{\partial x}{\partial \sigma}\right]\right)$$

Similarly (or by analogy) we obtain $$grad(\psi) \cdot rot(grad(\psi) \times grad(\chi)) = \quad (30)$$
$$\left[\frac{1}{J}\frac{\partial x}{\partial \psi}\right] \cdot \left(\frac{\partial}{\partial \sigma}\left[\frac{1}{J}\frac{\partial x}{\partial \sigma}\right]\right) + \left[\frac{1}{J}\frac{\partial x}{\partial \sigma}\right] \cdot \left(\frac{\partial}{\partial \chi}\left[\frac{1}{J}\frac{\partial x}{\partial \sigma}\right]\right)$$

Furthermore, using (25) it may be shown that $$\Omega \cdot grad(\chi) = \frac{1}{J}\left\{\frac{\partial x}{\partial \sigma} \frac{\partial x}{\partial \psi} \Omega\right\} = \frac{\left\{\frac{\partial x}{\partial \sigma} \frac{\partial x}{\partial \psi} \Omega\right\}}{\left\{\frac{\partial x}{\partial \sigma} \frac{\partial x}{\partial \psi} \frac{\partial x}{\partial \chi}\right\}} \quad (31)$$

and $$\Omega \cdot grad(\psi) = \frac{1}{J}\left\{\frac{\partial x}{\partial \sigma} \Omega \frac{\partial x}{\partial \chi}\right\} = \frac{\left\{\frac{\partial x}{\partial \sigma} \Omega \frac{\partial x}{\partial \chi}\right\}}{\left\{\frac{\partial x}{\partial \sigma} \frac{\partial x}{\partial \psi} \frac{\partial x}{\partial \chi}\right\}} \quad (32)$$

Making use of (7), the identity $$\underline{a} \times (\underline{b} \times \underline{c}) = (\underline{a} \cdot \underline{c})\underline{b} - (\underline{a} \cdot \underline{b})\underline{c} \quad (33)$$

and (29) to (32) the equations of motion, (19) and (20), can be written as $$\frac{\partial H}{\partial \psi} - \frac{\partial}{\partial \psi}\left(\frac{1}{2}\left[\frac{1}{\rho J}\frac{\partial x}{\partial \sigma}\right] \cdot \left[\frac{1}{\rho J}\frac{\partial x}{\partial \sigma}\right]\right) - \quad (34)$$
$$T\frac{\partial s}{\partial \psi} + \left[\frac{1}{\rho J}\frac{\partial x}{\partial \psi}\right] \cdot \left(\frac{\partial}{\partial \sigma}\left[\frac{1}{\rho J}\frac{\partial x}{\partial \sigma}\right]\right) + \frac{2}{\rho J}\left\{\frac{\partial x}{\partial \sigma}\frac{\partial x}{\partial \psi}\Omega\right\} = 0$$

and $$\frac{\partial H}{\partial \chi} - \frac{\partial}{\partial \chi}\left(\frac{1}{2}\left[\frac{1}{\rho J}\frac{\partial x}{\partial \sigma}\right] \cdot \left[\frac{1}{\rho J}\frac{\partial x}{\partial \sigma}\right]\right) - \quad (35)$$
$$T\frac{\partial s}{\partial \chi} + \left[\frac{1}{\rho J}\frac{\partial x}{\partial \chi}\right] \cdot \left(\frac{\partial}{\partial \sigma}\left[\frac{1}{\rho J}\frac{\partial x}{\partial \sigma}\right]\right) - \frac{2}{\rho J}\left\{\frac{\partial x}{\partial \sigma}\Omega\frac{\partial x}{\partial \chi}\right\} = 0$$

Note that the mapping described in this section is thus far valid for any choice of the variable $\sigma$. No use has been made yet of the fact that $\sigma$ should ultimately be interpreted as the natural coordinate as defined by (2) and (3).

The subsequent part of the analysis shall now account for the special significance of $\sigma$ as a natural coordinate. From (2), (3), (23) and (25) we obtain $$\frac{\partial x}{\partial \sigma} = \frac{h^2}{J}\left[\frac{\partial x}{\partial \psi}\right] \times \left[\frac{\partial x}{\partial \chi}\right]. \quad (36)$$

Hence, (36) implies that the covariant and contravariant forms of $\partial \underline{x}/\partial \sigma$ differ by the factor $h^2$. Furthermore, (36) implies $$\frac{\partial x}{\partial \sigma} \cdot \frac{\partial x}{\partial \sigma} = h^2, \quad \frac{\partial x}{\partial \sigma} \cdot \frac{\partial x}{\partial \psi} = 0, \quad \frac{\partial x}{\partial \sigma} \cdot \frac{\partial x}{\partial \chi} = 0. \quad (37)$$

The first relation (37) is the same as (3). Using (37) the equations (34) and (35) can be simplified to $$\frac{\partial H}{\partial \psi} - \frac{1}{\rho J}\frac{\partial}{\partial \psi}\left(\frac{h^2}{\rho J}\right) - T\frac{\partial s}{\partial \psi} + \frac{2}{\rho J}\left\{\frac{\partial x}{\partial \sigma}\frac{\partial x}{\partial \psi}\Omega\right\} = 0 \quad (38)$$

and $$\frac{\partial H}{\partial \chi} - \frac{1}{\rho J}\frac{\partial}{\partial \chi}\left(\frac{h^2}{\rho J}\right) - T\frac{\partial s}{\partial \chi} - \frac{2}{\rho J}\left\{\frac{\partial x}{\partial \sigma}\Omega\frac{\partial x}{\partial \chi}\right\} = 0 \quad (39)$$

It is quite remarkable that for irrotational isentropic flow, $$dH=0, \quad ds=0, \quad \underline{\Omega}=\underline{0}. \quad (40)$$

equations (38) and (39) can be integrated once.

5. Thermodynamic Relations

Making use of (12) and the definitions $$H \equiv c_p T_0, \quad u \equiv \sqrt{\underline{u} \cdot \underline{u}}, \quad \underline{W} \equiv \underline{\Omega} \times \chi, \quad W \equiv \sqrt{\underline{W} \cdot \underline{W}}, \quad \gamma \equiv c_p/c_v,$$
$$c^2 \equiv (c_p - c_v)\gamma T, \quad M \equiv u/c, \quad (41)$$

we can write $$c_p T_o = c_p T + \frac{1}{2}u^2 - \frac{1}{2}W^2 \qquad (42)$$

or $$\frac{T}{T_o} = \frac{1 + \frac{W^2}{2c_p T_o}}{1 + \frac{\gamma-1}{2}M^1}. \qquad (43)$$

$T_0$ is the stagnation temperature in the absolute system, c is the sound speed and M the Mach number in the rotating frame. Hence, $$T_o = T_o(\psi,\chi). \qquad (44)$$

Combining (14) with the first law of thermodynamics and the equation of state we can shown that the isentropic relations $$\frac{\rho}{\rho_o} = \left[\frac{T}{T_o}\right]^{\frac{1}{\gamma-1}}, \frac{p}{p_o} = \left[\frac{T}{T_o}\right]^{\frac{\gamma}{\gamma-1}}, \frac{c}{c_o} = \left[\frac{T}{T_o}\right]^{\frac{1}{2}}, \qquad (45)$$

hold along streamlines. In these expressions $\rho_0$, $P_0$ and $c_0$ should be interpreted as the stagnation density, the stagnation pressure and the stagnation sound speed, respectively, in the absolute system and, by virtue of (14), $$\rho_o = \rho_o(\psi,\chi),\ P_o = P_o(\psi,\chi),\ c_o = c_o(\psi,\chi). \qquad (46)$$

It is important to note that with the help of (14) and 44) to 46) all thermodynamic quantities can be related to integrals of motion! For the mass flux we obtain (see (3) and the first equation (23))

$$m^2 \equiv \rho^2 u^2 = [grad(\psi) \times grad(\chi)] \cdot [grad(\psi) \times grad(\chi)] \qquad (47)$$

$$= \frac{h^2}{J^2} = \rho_o^2 c_o^2 \left[1 + \frac{W^2}{2c_p T_o}\right]^{\frac{\gamma+1}{\gamma-1}} \frac{M^2}{\left[1 + \frac{\gamma-1}{2}M^2\right]^{\frac{\gamma+1}{\gamma-1}}}.$$

We may now note that the equations of motion (38), (39), together with the condition (36), that defines the natural coordinate σ, and the thermodynamic relations constitute a complete set of equations in inverse coordinates..

6. Cylindrical Polar Coordinates as Dependent Variables

For many applications, including flows through turbines, it is convenient to express the coordinate vector $\underline{x}$ in terms of cylindrical polar coordinates. Introducing cylindrical polar coordinates (x,r,θ) it may be shown that Jacobi's determinant assumes the form $$J = \begin{vmatrix} \frac{\partial x}{\partial \sigma} & \frac{\partial x}{\partial \psi} & \frac{\partial x}{\partial \chi} \\ \frac{\partial r}{\partial \sigma} & \frac{\partial r}{\partial \psi} & \frac{\partial r}{\partial \chi} \\ r\frac{\partial \theta}{\partial \sigma} & r\frac{\partial \theta}{\partial \psi} & r\frac{\partial \theta}{\partial \chi} \end{vmatrix} \qquad (48)$$

$$= \frac{\partial x}{\partial \sigma}\frac{\partial r}{\partial \psi}r\frac{\partial \theta}{\partial \chi} + \frac{\partial x}{\partial \psi}\frac{\partial r}{\partial \chi}r\frac{\partial \theta}{\partial \sigma} + \frac{\partial x}{\partial \chi}\frac{\partial r}{\partial \sigma}r\frac{\partial \theta}{\partial \psi} -$$

$$\frac{\partial x}{\partial \sigma}\frac{\partial r}{\partial \chi}r\frac{\partial \theta}{\partial \psi} - \frac{\partial x}{\partial \psi}\frac{\partial r}{\partial \sigma}r\frac{\partial \theta}{\partial \chi} - \frac{\partial x}{\partial \chi}\frac{\partial r}{\partial \psi}r\frac{\partial \theta}{\partial \sigma}$$

Assuming that the angular velocity vector $\underline{\Omega}$ is parallel to the axis and points in its positive direction, we find $$\left\{\frac{\partial x}{\partial \sigma}\frac{\partial x}{\partial \psi}\Omega\right\} = \Omega r\frac{\partial r}{\partial \sigma}\frac{\partial \theta}{\partial \psi} - \Omega r\frac{\partial r}{\partial \psi}\frac{\partial \theta}{\partial \sigma} \qquad (49)$$

and $$\left\{\frac{\partial x}{\partial \sigma}\Omega\frac{\partial x}{\partial \chi}\right\} = \Omega r\frac{\partial r}{\partial \chi}\frac{\partial \theta}{\partial \sigma} - \Omega r\frac{\partial r}{\partial \sigma}\frac{\partial \theta}{\partial \chi}. \qquad (50)$$

The relation (37), that defines the natural coordinate σ, may be expressed as $$\left(\frac{\partial x}{\partial \sigma}\right)^2 + \left(\frac{\partial r}{\partial \sigma}\right)^2 + \left(r\frac{\partial \theta}{\partial \sigma}\right)^2 = h^2, \qquad (51)$$

$$\frac{\partial x}{\partial \sigma}\frac{\partial x}{\partial \psi} + \frac{\partial r}{\partial \sigma}\frac{\partial r}{\partial \psi} + \left(r\frac{\partial \theta}{\partial \sigma}\right)\left(r\frac{\partial \theta}{\partial \psi}\right) = 0,$$

$$\frac{\partial x}{\partial \sigma}\frac{\partial x}{\partial \chi} + \frac{\partial r}{\partial \sigma}\frac{\partial r}{\partial \chi} + \left(r\frac{\partial \theta}{\partial \sigma}\right)\left(r\frac{\partial \theta}{\partial \chi}\right) = 0.$$

Inserting (48) to (50) in (38) and (39) leads to a complete set of equations in cylindrical polar coordinates, if the equations (51), that define the natural coordinate, and the thermodynamic relations are added.

7. Cartesian Coordinates as Dependent Variables

In most cases, including inverse design of wings, for example, the coordinate vector $\underline{x}$ is preferably expressed in terms of Cartesian coordinates and the frame of reference is not rotating. Hence, we can set $\underline{\Omega}=\underline{0}$. Introducing Cartesian coordinates (x,y,z) Jacobi's determinant assumes the form $$J = \frac{\partial x}{\partial \sigma}\frac{\partial y}{\partial \psi}\frac{\partial z}{\partial \chi} + \frac{\partial x}{\partial \psi}\frac{\partial y}{\partial \chi}\frac{\partial z}{\partial \sigma} + \qquad (52)$$

$$\frac{\partial x}{\partial \chi}\frac{\partial y}{\partial \sigma}\frac{\partial z}{\partial \psi} - \frac{\partial x}{\partial \sigma}\frac{\partial y}{\partial \chi}\frac{\partial z}{\partial \psi} - \frac{\partial x}{\partial \psi}\frac{\partial y}{\partial \sigma}\frac{\partial z}{\partial \chi} - \frac{\partial x}{\partial \chi}\frac{\partial y}{\partial \psi}\frac{\partial z}{\partial \sigma}$$

The relation (37), that defines the natural coordinate σ, may be expressed as $$\left(\frac{\partial x}{\partial \sigma}\right)^2 + \left(\frac{\partial y}{\partial \sigma}\right)^2 + \left(\frac{\partial z}{\partial \sigma}\right)^2 = h^2, \qquad (53)$$

$$\frac{\partial x}{\partial \sigma}\frac{\partial x}{\partial \psi} + \frac{\partial y}{\partial \sigma}\frac{\partial y}{\partial \psi} + \frac{\partial z}{\partial \sigma}\frac{\partial z}{\partial \psi} = 0,$$

$$\frac{\partial x}{\partial \sigma}\frac{\partial x}{\partial \chi} + \frac{\partial y}{\partial \sigma}\frac{\partial y}{\partial \chi} + \frac{\partial z}{\partial \sigma}\frac{\partial z}{\partial \chi} = 0.$$

8. Isentropic Flows

As pointed out earlier, the equations (38) and (39) can be substantially simplified if we restrict the consideration to isentropic flows. In this case the conditions (40) lead to $$\left. \begin{aligned} \frac{\partial}{\partial \psi}\left(\frac{h^2}{\rho J}\right) = 0 &\Rightarrow \frac{h^2}{\rho J} = f_1(\sigma, \chi) \\ \frac{\partial}{\partial \chi}\left(\frac{h^2}{\rho J}\right) = 0 &\Rightarrow \frac{h^2}{\rho J} = f_2(\sigma, \psi) \end{aligned} \right\} \Rightarrow \frac{h^2}{\rho J} = f(\sigma), \quad (54)$$

where $f_1$ and $f_2$ are functions of integration. Moreover, as we have not yet defined the scaling of the natural coordinate $\sigma$ the function $f(\sigma)$ can be "absorbed" by re-scaling the natural coordinate, $$f(\sigma)d\sigma \rightarrow d\sigma. \quad (55)$$

For convenience we may also assume that the normalization of the density is included in this stretching of the natural coordinate and from now on consider $\rho$ as the density that is normalized with the stagnation density. Hence we can write $$h^2 = \rho J. \quad (56)$$

and $$\rho = \rho(M) = \left[1 + \frac{\gamma+1}{2}M^2\right]^{\frac{-1}{\gamma-1}}. \quad (57)$$

On the other hand, by suitable scaling of the stream functions, the stagnation sound speed can also be absorbed and (47) may be normalized accordingly, $$\frac{h^2}{J^2} = m^2(M) = \frac{M^2}{\left[1 + \frac{\gamma-1}{2}M^2\right]^{\frac{\gamma+1}{\gamma-1}}}. \quad (58)$$

Combining (36) and (56) yields $$\frac{1}{\rho}\frac{\partial \underline{x}}{\partial \sigma} = \left[\frac{\partial \underline{x}}{\partial \psi}\right] \times \left[\frac{\partial \underline{x}}{\partial \chi}\right]. \quad (59)$$

Eliminating J and h from (56), (58) and the first equation (37) leads to $$\frac{\partial \underline{x}}{\partial \sigma} \cdot \frac{\partial \underline{x}}{\partial \sigma} = \left(\frac{\rho}{m}\right)^2. \quad (60)$$

We may now regard (59) as the equation for $\underline{x}=\underline{x}(\sigma,\psi,\chi)$, where the density $\rho$ is related to $|\partial \underline{x}/\partial \sigma|$ by (57), (58) and (60). In other words, (57) and (58) may be considered as a parametric representation (in terms of the Mach number) of the function $m=m(\rho)$ that can be inserted in (60) to obtain the desired expression for the density.

The structure of the equations becomes still more transparent by considering the special case of plane two-dimensional flows. This simplification is achieved, for example, by introducing Cartesian coordinates, $\underline{x}=(x,y,z)$ and defining the stream function $\chi$ by $$\chi = z. \quad (61)$$

In this case (59) can be reduced to $$\frac{\partial x}{\partial \sigma} = \rho \frac{\partial y}{\partial \psi}, \quad \frac{\partial y}{\partial \sigma} = -\rho \frac{\partial x}{\partial \psi} \quad (62)$$

and (57), (58) and (60) can be put into the form $$\left(\frac{\partial x}{\partial \sigma}\right)^2 + \left(\frac{\partial y}{\partial \sigma}\right)^2 = \left(\frac{\rho}{m}\right)^2, \rho = \rho(M), m = m(M). \quad (63)$$

The Jacobian reduces to $$J = \frac{\partial x}{\partial \sigma}\frac{\partial y}{\partial \psi} - \frac{\partial x}{\partial \psi}\frac{\partial y}{\partial \sigma}. \quad (64)$$

Combining (56), (58), (62) and (64) it may be shown that $$\left(\frac{\partial x}{\partial \psi}\right)^2 + \left(\frac{\partial y}{\partial \psi}\right)^2 = \frac{1}{m^2}. \quad (65)$$

Considering now an incremental stream tube it is easy to shown that the equations (62), (63) and (65) are in agreement with the equations of motion. Eliminating $\rho d\sigma$ from (62) and (63) we obtain the correct relation between mass-flow vector and velocity vector. On the other hand (65) relates the massflow to the cross-sectional area of the incremental stream tube. The massflow m reaches its maximum at M=1. Hence, the term on the right-hand side of (65) reaches its minimum at M=1. Considering an incremental Laval nozzle with slowly varying width dy along a line y=constant, for example, the convergent-divergent character of the cross-section is immediately apparent from (65). Nevertheless, it is surprising that the system of equations (62) is generally elliptic. It appears that the hyperbolic character of supersonic flow is hidden in the combination of (62) and (63) with $\partial m/\partial M<0$.

Finally, for the special case of incompressible flows (62) reduces to Laplace's equation, $$\frac{\partial x}{\partial \sigma} = \frac{\partial y}{\partial \psi}, \frac{\partial y}{\partial \sigma} = -\frac{\partial x}{\partial \psi} \Rightarrow \frac{\partial^2 x}{\partial \sigma^2} + \frac{\partial^2 x}{\partial \psi^2} = 0, \frac{\partial^2 y}{\partial \sigma^2} + \frac{\partial^2 y}{\partial \psi^2} = 0, \quad (66)$$

which is in agreement with the properties of a special type of conformal mapping that is usually called hodograph transformation.

9. General Limitations with Respect to Supersonic Flow

An important limitation that applies to any coordinate inversion and is relevant for supersonic flow appears if the Jacobian vanishes, $$J = 0 \quad (67)$$

Flows that satisfy the condition (67) are not included in the solution space of the inverse equations. The reader is referred to the corresponding discussion by Courant and Friedrichs [1]. Flows that satisfy (67) are called simple waves. An expansion fan in an isentropic flow, for example, is not a solution of the equations (57) to (60). To obtain a complete set of solutions we need to add the solutions of (67) to the solution space of any set of inverse equations. In Cartesian coordinates, for example, the general solution of (67) can be expressed as $$G(x,y,z) = 0. \quad (68)$$

The validity of (68) is easily confirmed by introducing (52) in (67) and inserting (68).

10. Axisymmetric Flows

For the special case of axisymmetric flow in the absolute frame of reference the equations (19) and (20) reduce to a generalized form of the Bragg-Hawthorne equation. Without giving the details of deriving the equation we simply state the results. For axisymmetric flows we introduce a single stream function $\psi$ and the specific angular momentum C as an additional integral of motion:

$$\rho u = \frac{1}{r}\frac{\partial \psi}{\partial r}, \rho v = -\frac{1}{r}\frac{\partial \psi}{\partial x}, C = C(\psi) = rw, \tag{69}$$

where x and r are the axial and radial coordinates, and u, v and w denote the axial, radial and azimuthal velocity components, respectively. In this case the Euler equation is found to be $$\frac{1}{\rho r}\frac{\partial}{\partial r}\left[\frac{1}{pr}\frac{\partial \psi}{\partial r}\right] + \frac{1}{pr^2}\frac{\partial}{\partial x}\left[\frac{1}{\rho}\frac{\partial \psi}{\partial x}\right] = \frac{dH}{d\psi} - T\frac{ds}{d\psi} - \frac{C}{r^2}\frac{dC}{d\psi}, \tag{70}$$

where the total enthalpy $$H = H(\psi) = c_p T + \tfrac{1}{2}[u^2 + v^2 + w^2] \tag{71}$$

and the entropy $s = s(\psi)$ are again integrals of motion. Equation (47) reduces to $$\rho^2[u^2 + v^2 + w^2] = \left[\frac{1}{r}\frac{\partial \psi}{\partial x}\right]^2 + \left[\frac{1}{r}\frac{\partial \psi}{\partial r}\right]^2 + \tag{72}$$
$$\frac{C^2}{r^2} \frac{\rho_0^2}{\left[1 + \frac{\gamma-1}{2}M^2\right]^{\frac{2}{\gamma-1}}}$$
$$= \frac{\rho_0^2 c_0^2 M^2}{\left[1 + \frac{\gamma-1}{2}M^2\right]^{\frac{\gamma+1}{\gamma-1}}}$$

The remaining equations are the same as in section 5. We may note that, regarding the density $\rho$ and the entropy s as constants, replacing the total enthalpy (71) by the total head, $$H = H(\psi) = \frac{p}{\rho} + \frac{1}{2}[u^2 + v^2 + w^2], \tag{73}$$

and eliminating the density from the definition of the stream function, $$u = \frac{1}{r}\frac{\partial \psi}{\partial r}, v = -\frac{1}{r}\frac{\partial \psi}{\partial x}, \tag{74}$$

(70) reduces to the well-known Bragg-Hawthorne equation for incompressible axisymmetric flow:

$$\frac{\partial^2 \psi}{\partial r^2} - \frac{1}{r}\frac{\partial \psi}{\partial r} + \frac{\partial^2 \psi}{\partial x^2} = r^2\frac{dH}{d\psi} - C\frac{dC}{d\psi}. \tag{75}$$

At this point we introduce the mapping $$(x,r) \longleftrightarrow (\sigma,\psi) \tag{76}$$

to inverse coordinates and, for simplification, we restrict consideration to incompressible flow. In this case the streamline coordinate $\sigma$ is defined by $$h\frac{\partial \sigma}{\partial x} = \frac{\frac{\partial \psi}{\partial r}}{\sqrt{\left(\frac{\partial \psi}{\partial x}\right)^2 + \left(\frac{\partial \psi}{\partial r}\right)^2}}, \tag{77}$$

$$h\frac{\partial \sigma}{\partial r} = \frac{-\frac{\partial \psi}{\partial x}}{\sqrt{\left(\frac{\partial \psi}{\partial x}\right)^2 + \left(\frac{\partial \psi}{\partial r}\right)^2}},$$

where $h = h(\sigma,\psi)$ is the stretching function that provides the basis for compatibility between orthogonality of the curves $\sigma(x,r) = $ constant and $\psi(x,r) = $ constant and the uniform meaning of $hd\sigma$.

$$hd\sigma = \sqrt{(dx)^2 + (dr)^2} \Rightarrow \left(\frac{\partial x}{\partial \sigma}\right)^2 + \left(\frac{\partial r}{\partial \sigma}\right)^2 = h^2, \tag{78}$$

as the length increment along streamlines. The condition for the curvilinear coordinates to be orthogonal is again $$\frac{\partial x}{\partial \sigma}\frac{\partial x}{\partial \psi} + \frac{\partial r}{\partial \sigma}\frac{\partial r}{\partial \psi} = 0. \tag{79}$$

Introducing Jacobi's determinant, $$J \equiv \frac{\partial x}{\partial \sigma}\frac{\partial r}{\partial \psi} - \frac{\partial r}{\partial \sigma}\frac{\partial x}{\partial \psi}, \tag{80}$$

the partial derivatives of $\sigma(x,r)$ and $\psi(x,r)$ can be expressed as $$\frac{\partial \sigma}{\partial x} = \frac{1}{J}\frac{\partial r}{\partial \psi}, \frac{\partial \sigma}{\partial r} = -\frac{1}{J}\frac{\partial x}{\partial \psi}, \frac{\partial \psi}{\partial x} = -\frac{1}{J}\frac{\partial r}{\partial \sigma}, \frac{\partial \psi}{\partial r} = \frac{1}{J}\frac{\partial x}{\partial \sigma}. \tag{81}$$

For a function $f(x,r) = g(\sigma,\psi)$ the conversion of derivatives can be expressed as $$\frac{\partial f}{\partial x} = \frac{1}{J}\left[\frac{\partial r}{\partial \psi}\frac{\partial g}{\partial \sigma} - \frac{\partial r}{\partial \sigma}\frac{\partial g}{\partial \psi}\right], \frac{\partial f}{\partial r} = -\frac{1}{J}\left[\frac{\partial x}{\partial \psi}\frac{\partial g}{\partial \sigma} - \frac{\partial x}{\partial \sigma}\frac{\partial g}{\partial \psi}\right]. \tag{82}$$

Inserting (81) in (82) we obtain the conversion of the second derivatives:

$$\frac{\partial^2 \psi}{\partial x^2} = \frac{1}{J}\left[\frac{\partial r}{\partial \sigma}\frac{\partial}{\partial \psi}\left(\frac{1}{J}\frac{\partial r}{\partial \sigma}\right) - \frac{\partial r}{\partial \psi}\frac{\partial}{\partial \sigma}\left(\frac{1}{J}\frac{\partial r}{\partial \sigma}\right)\right], \tag{83}$$

$$\frac{\partial^2 \psi}{\partial r^2} = \frac{1}{J}\left[\frac{\partial x}{\partial \sigma}\frac{\partial}{\partial \psi}\left(\frac{1}{J}\frac{\partial x}{\partial \sigma}\right) - \frac{\partial x}{\partial \psi}\frac{\partial}{\partial \sigma}\left(\frac{1}{J}\frac{\partial x}{\partial \sigma}\right)\right].$$

Adding the second derivatives according to (83), and making use of (78), (79) and (80), integration by parts yields $$\frac{\partial^2 \psi}{\partial x^2} + \frac{\partial^2 \psi}{\partial r^2} = \frac{1}{J}\frac{\partial}{\partial \psi}\left(\frac{h^2}{J}\right). \tag{84}$$

Furthermore, from (78), (79) and (80) it follows that $$\frac{\partial x}{\partial \sigma} = \frac{h^2}{J} \frac{\partial r}{\partial \psi} \Rightarrow \frac{1}{r} \frac{\partial \psi}{\partial r} = \frac{1}{rJ} \frac{\partial x}{\partial \sigma} = \frac{h^2}{rJ^2} \frac{\partial r}{\partial \psi}. \quad (85)$$

Combining (75) with (84) and (85) we finally obtain the inverse Bragg-Hawthorne equation $$\frac{r}{J} \frac{\partial}{\partial \psi}\left(\frac{h^2}{rJ}\right) = r^2 \frac{dH}{d\psi} - C \frac{dC}{d\psi}. \quad (86)$$

A complete system of equations is obtained by added (78) and (79). The equation (86) is again remarkably simple. To check the previous results a somewhat more elaborate analysis has been chosen in this case to derive the inverse equation. It is tedious, but rather straightforward to eliminate the Jacobian from (86) in favor of partial derivatives of the radius. Making use of (78), (79) and (80) the equation (86) can be written in the form $$\left(\frac{\partial r}{\partial \psi}\right)^2 \frac{\partial^2 r}{\partial \sigma^2} + \frac{\partial r}{\partial \sigma} \frac{\partial r}{\partial \psi} \frac{\partial^2 r}{\partial \sigma \partial \psi} + \left[h^2 - \left(\frac{\partial r}{\partial \sigma}\right)^2\right]\left[\frac{\partial^2 r}{\partial \psi^2} + \frac{1}{r}\left(\frac{\partial r}{\partial \psi}\right)^2\right] - \quad (87)$$

$$\frac{1}{h} \frac{\partial r}{\partial \sigma} \frac{\partial r}{\partial \psi}\left[\frac{\partial r}{\partial \sigma} \frac{\partial h}{\partial \psi} + \frac{\partial r}{\partial \psi} \frac{\partial h}{\partial \sigma}\right] + h^2\left(\frac{\partial r}{\partial \psi}\right)^3 \left\{r^2 \frac{dH}{d\psi} - C \frac{dC}{d\psi}\right\} = 0$$

and the derivative of the coordinate stretching factor with respect to the stream function can be expressed as $$\frac{\partial h}{\partial \psi} = \frac{\frac{\partial r}{\partial \psi}}{h^2 - \left(\frac{\partial}{\partial \sigma}\right)^2}\left[\frac{\partial h}{\partial \sigma} \frac{\partial r}{\partial \sigma} - h \frac{\partial^2 r}{\partial \sigma^2}\right]. \quad (88)$$

The idea is now to solve (87) by means of a Gauss-Seidel iteration scheme and determine the coordinate stretching factor h using a stepwise integration of (88). From (74), (78), (81) and (85) we obtain $$u^2 + v^2 = \frac{1}{r^2}\left[\left(\frac{\partial \psi}{\partial x}\right)^2 + \left(\frac{\partial \psi}{\partial r}\right)^2\right] \quad (89)$$

$$= \frac{1}{r^2 J^2}\left[\left(\frac{\partial x}{\partial \sigma}\right)^2 + \left(\frac{\partial r}{\partial \sigma}\right)^2\right] = \frac{h^2}{r^2 J^2} = \frac{h^2 - \left(\frac{\partial r}{\partial \sigma}\right)^2}{h^2 r^2 \left(\frac{\partial r}{\partial \psi}\right)^2}$$

The flow speed can now be expressed as $$\sqrt{u^2 + v^2 + w^2} = \sqrt{u^2 + v^2 + \left(\frac{C}{r}\right)^2} = \sqrt{\frac{h^2 - \left(\frac{\partial}{\partial \sigma}\right)^2}{h^2 r^2 \left(\frac{\partial r}{\partial \psi}\right)^2} + \left(\frac{C}{r}\right)^2}. \quad (90)$$

11. Difficulties Encountered with Applications of Inverse Equations

For the transform of the equation to their inverse form it is essential to choose the domain of definition such that a one-to-one mapping is generated. For simply connected domains of definition, such as turbine blade channels, for example, this difficulty would generally not appear. However, in the case of flow fields that are not simply connected the difficulty arises that the entire flow field must be suitably cut to obtain domains for which a one-to-one mapping exists. A further point that should be addressed concerns the chosen domain of definition for the stream functions. In this context the reader is referred to Keller [12] for more details. If a wake appears within the domain of definition there may be a problem with streamlines, originating on the downstream side, for which the integrals of motion have not been defined. For this reason it is a good idea to include a check in a numerical solution procedure that warns the user in cases where integrals of motion have been taken beyond their intended domain of definition.

12. Two Simple Examples

Figure 1:
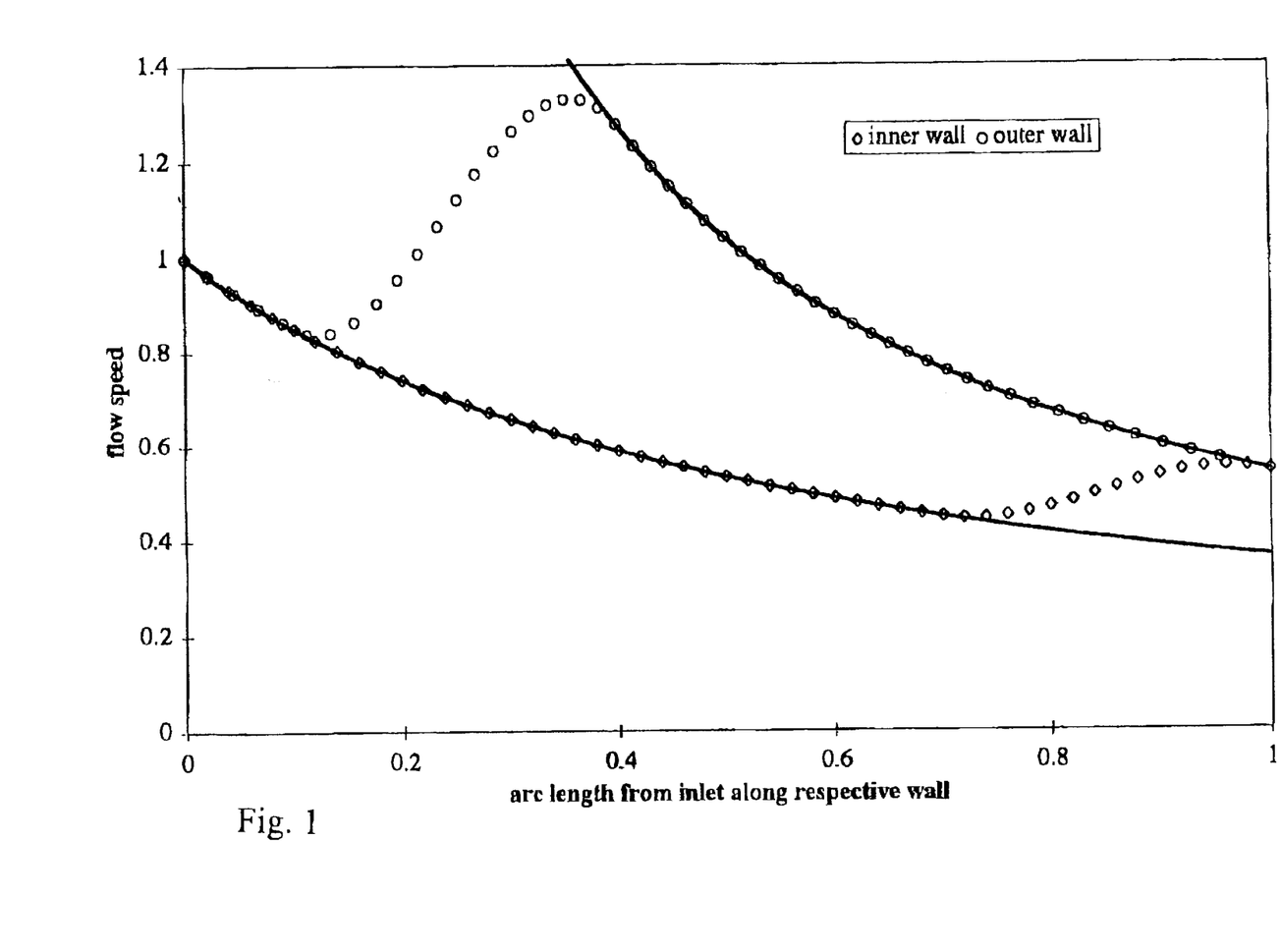
FIG. 1 illustrates distributions of flow speed along the two walls of an annular diffuser. The solid lines mark curves of maximum adverse pressure gradient. Smooth transitions between these curves have been generated using fourth-order polynomials, in order to define suitable distributions of flow speed along the diffuser walls.
Figure 2:
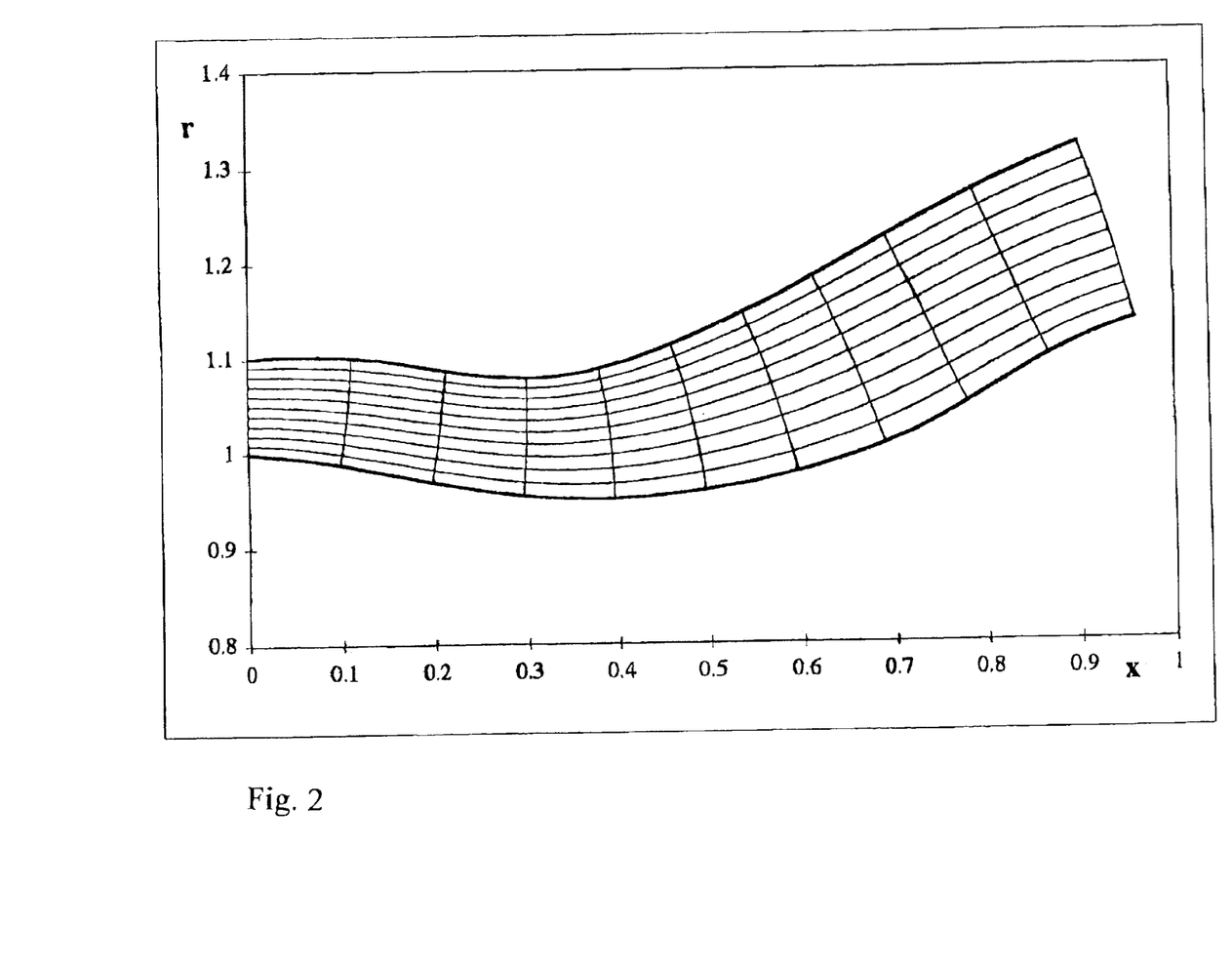
FIG. 2 illustrates a map of streamlines and curves of constant σ that corresponds to the boundary conditions defined by the distributions of flow speed shown in FIG. 1.

To demonstrate the capabilities of inverse equations we consider two simple axisymmetric problems. The design of a compressor diffuser of a gas turbine is often strongly restricted by the space requirements of turbine and combustor. As a consequence there is usually the necessity of choosing a curved diffuser. Although there is broad empirical knowledge on the performance of straight annular diffusers (see Kline, Abbott and Fox [13], for example), it may often be difficult to apply this information to arbitrary curved diffusers. However, knowing the relation between the largest acceptable adverse pressure gradient and the ratio of (local) length and inlet width of a diffuser we can specify restrictions for the static pressure distributions along the inner and outer walls of a curved annular diffuser. As indicated in FIG. 1, a possible strategy to design a curved diffuser may be defined as follows. Near the diffuser inlet the flow speeds along both walls first follow a curve the corresponds to the largest acceptable pressure gradient. After a certain arc length a smooth transition to a different curve of maximum pressure increase is chosen for the outer diffuser wall. For a certain distance the flow speed distributions along the two walls follow two different curves of largest pressure increase. This domain will generate the curved portion of the diffuser. Toward the exit of the diffuser a smooth transition of the flow speed along the inner wall is introduced, in order to obtain a velocity profile at the diffuser exit that is as uniform as possible. The second transition beings the flow speed along the inner wall back to a common curve of maximum pressure increase. Knowing the flow speed distributions along both diffuser walls enables us to express $\partial r/\partial \sigma$ in terms of $\partial r/\partial \psi$, making use of equation (90). At the inlet to the diffuser we set $\partial r/\partial \sigma = 0$, and at the exit of the diffuser we choose a linear transition for $\partial r/\partial \sigma$ between the corresponding values at the endpoints of the two walls. Choosing any kind of distributions for the total head and the circulation at the diffuser inlet does not cause additional difficulties, because $H=H(\psi)$ and $C=C(\psi)$ appear as integrals of motion in the governing equations (87) and (88). It is now easy to find a numerical solution with the help of the Gauss-Seidel iteration scheme. For more details the reader is referred to Keller et al. [10]. For the simple example presented it has been assumed that the flow is incompressible, the total head is uniform and the flow is free of swirl. FIG. 2 illustrates a streamline map that corresponds to the boundary conditions defined by the flow speed distributions shown in FIG. 1. Furthermore, FIG. 2 shows lines of constant σ. It should be pointed out that, according to the definition of the natural coordinate, lines of constant σ are always orthogonal to streamlines (i.e., lines of constant ψ and χ). Thus we may observe that one of the remarkable spin-offs of using inverse equations is the automatic generation of an orthogonal contour-fitted coordinate system in the original space. Although the actual computation is done in a cubic domain of definition with Cartesian coordinates in inverse space, a curvilinear orthogonal grid is simultaneously generated together with the solution in the original space. Furthermore, the density of grid lines gets automatically high in domains of large gradients. For these reasons the accuracy of the method is remarkably high (for a fixed number of grid points) and the convergence is very fast.

Figure 3:
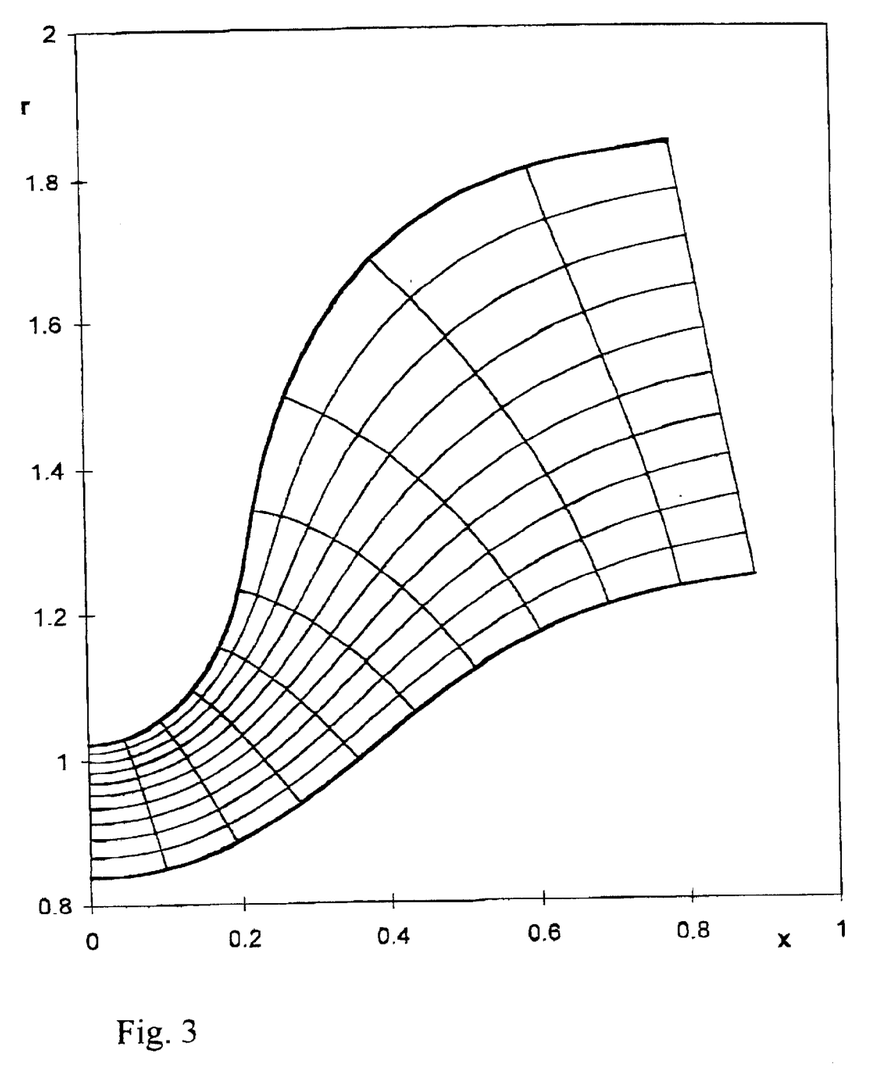
FIG. 3 illustrates a map of streamlines and curves of constant σ of a turbine inlet flow.
Figure 4:
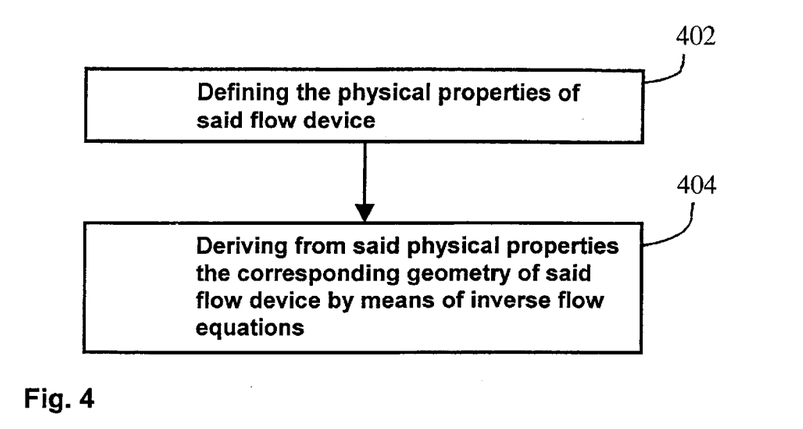
Figure 5:
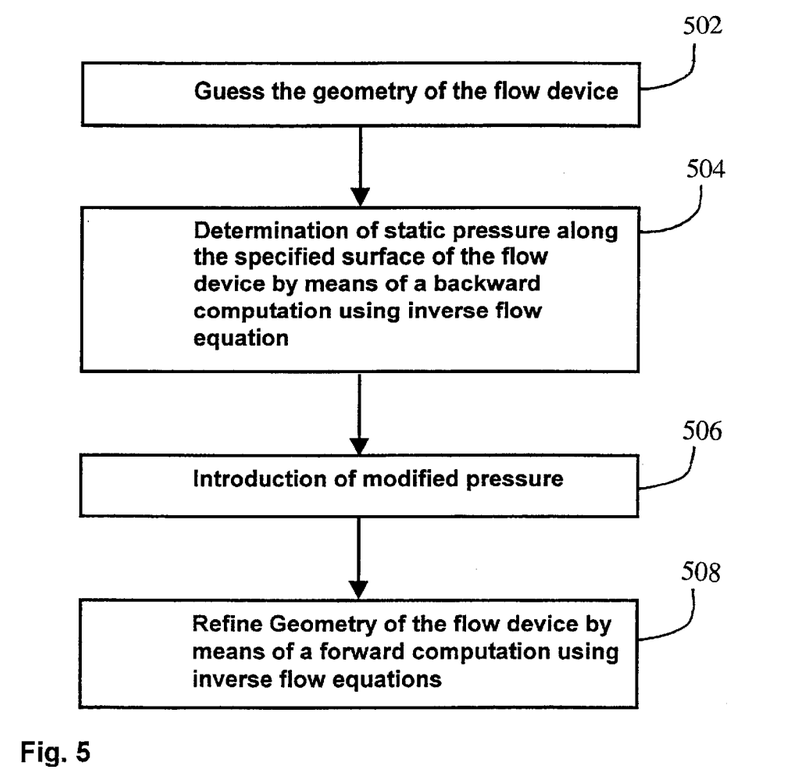

The second example (see FIG. 3) is a turbine inlet flow. In this case the geometry of an annular duct is imposed as a boundary condition, combined with a linear variation of the flow angles at the inlet and exit, respectively. According to ABB's convention the flow is from right to left. This is one of the examples that has been used to check the equations. To include and discuss three-dimensional examples of inverse design would exceed the scope of this paper. Such results will be presented elsewhere.

13. Concluding Remarks

With the transformation of the Euler equation to their inverse form, using a pair of stream functions and the natural coordinate as independent variables, a theoretical basis has been introduced for a broad class of extremely powerful inverse computation methods. Instead of searching for a geometry of a flow device that will lead to certain physical properties, the physical properties can be defined in advance and the solution of the inverse equations directly leads to the corresponding geometry. It has become easier to arrive at an optimized design. However, the difficulty of defining an optimum remains.

From a practical point of view it may be convenient to proceed as follows. As a preparation for the optimum design of a certain flow device we introduce a first guess for its geometry, that may satisfy certain basic constraints. Secondly we use the inverse method for a "backward computation". In other words, we specify the geometry according to the first guess and determine the static pressure distribution along the surface. In a second step we modify the static pressure distribution along the surface according to the requirements of the optimization and introduce the modified static pressure distribution as the boundary condition for the "forward computation". It should be noted that the inverse equations provide an excellent basis for using both physical quantities or the geometry of a flow device to define the boundary conditions. In fact it is even easy to use combinations of geometrical and physical boundary conditions.

Hence, it seems that there is justified hope that computation methods that are based on inverse equations will become extremely efficient tools to arrive at optimized flow devices.

Although it might appear that the existence of integrals of motion is essential to derive a set of antisymmetric equations of the form (19), (29). However, it is interesting that the extension to non-adiabatic flows of both antisymmetric equations and transformation to inverse coordinates is relatively simple, including the case of the general time-independent Navier-Stokes equations.

References

[1] R. Courant and K. O. Friedrichs, Supersonic flow and shock waves, Interscience, New York (1967).

[2] J. J. Keller, A pair of stream functions for three-dimensional vortex flows, Z. angew. Math. Phys. 47 (1996), 821.

[3] A. Jameson, N. A. Pierce, and L. Martinelli, Optimum aerodynamic design using the Navier-Stokes equations, AIAA paper 97–0101, 35th Aerospace Sciences Meeting, Reno, Nev. 1997.

[4] M. B. Giles and M. Drela, Two-dimensional transonic aerodynamic design method, AIAA Journal 25 (1987), 1199

[5] T. Dang and V. Isgro, Inverse method for turbomachine blades using existing time-marching techniques, ASME paper 94-GT-20, International Gas Turbine and Aeroengine Congress, The Hague, Netherlands, 1994.

[6] G. S. Dulikravich, Shape inverse design and optimization for three-dimensional aerodynamics, AIAA paper 95–0695, 33rd Aerospace Sciences Meeting, Reno, Nev. 1995.

[7] M. J. Pandya and O. Baysal, Gradient-based aerodynamic shape optimization using ADI method for large-scale problems, AIAA paper 96–0091, 34th Aerospace Sciences Meeting, Reno, Nev. 1996.

[8] I. K. Jennions, The role of CFD in the design process, AGARD Paper, 7 Rue Ancelle, 92200 Neuilly sur Seine, France, Lecture Series 195, May to June 1994.

[9] M. G. Turner and M. B. Giles, Design and analysis of internal flow fields using a two stream function formulation, ASME Winter Annual Meeting 1990, FED Vol. 103, 203.

[10] J. J. Keller, W. Egli, and J. Exley, Force- and loss-free transitions between flow states, Z. angew. Math. Phys. 36 (1985), 854.

[11] J. J. Keller, W. Egli, and R. Althaus, Vortex breakdown as a fundamental element of vortex dynamics, Z. angew. Math. Phys. 39 (1988), 404.

[12] J. J. Keller, On the interpretation of vortex breakdown, Phys Fluids 7 (7), (1995), 1696.

[13] S. J. Kline, D. E. Abbott and R. W. Fox, Optimum design of straight-walled diffusers, J. Basic Eng., Trans. ASME 81, Series D (September 1959).

While the invention has been described in detail with reference to preferred embodiments thereof, it will be apparent to one skilled in the art that various changes can be made, and equivalents employed, without departing from the scope of the invention.

What is claimed is:

1. A method for designing a flow device, comprising the steps of:

defining the physical properties of said flow device; and deriving from said physical properties the corresponding geometry of said flow device via inverse flow equations; and forming the flow device based on the derived geometry;

wherein said step of deriving the geometry comprising deriving geometry using inverse flow equations of the form:

$$\frac{\partial \underline{x}}{\partial \sigma} = \frac{h^2}{J} \frac{\partial \underline{x}}{\partial \psi} \times \frac{\partial \underline{x}}{\partial \chi} \qquad (1)$$

with the stream functions $\psi$ and $\chi$, the natural (streamline) coordinate $\sigma$, the position vector $\underline{x}$, wherein $J$ denotes the Jacobi determinant;

$$J = \frac{\partial \underline{x}}{\partial \sigma} \left[ \frac{\partial \underline{x}}{\partial \psi} \times \frac{\partial \underline{x}}{\partial \chi} \right] \equiv \left\{ \frac{\partial \underline{x}}{\partial \sigma} \frac{\partial \underline{x}}{\partial \psi} \frac{\partial \underline{x}}{\partial \chi} \right\}, \qquad (2)$$

and wherein h is the stretching factor of the natural coordinate defined by $$h^2 \equiv \frac{\partial \underline{x}}{\partial \sigma} \cdot \frac{\partial \underline{x}}{\partial \sigma}. \qquad (3)$$

with the auxiliary equations $$\frac{\partial H}{\partial \psi} - T\frac{\partial s}{\partial \psi} - \frac{1}{\rho J}\frac{\partial}{\partial \psi}\left(\frac{h^2}{\rho J}\right) + \frac{2}{\rho J}\left\{\frac{\partial x}{\partial \sigma}\frac{\partial x}{\partial \psi}\Omega\right\} = 0, \quad \text{and} \qquad (4)$$

$$\frac{\partial H}{\partial \chi} - T\frac{\partial s}{\partial \chi} - \frac{1}{\rho J}\frac{\partial}{\partial \chi}\left(\frac{h^2}{\rho J}\right) - \frac{2}{\rho J}\left\{\frac{\partial x}{\partial \sigma}\Omega\frac{\partial x}{\partial \psi}\right\} = 0, \qquad (5)$$

wherein $H=H(\psi,\chi)$ is the total enthalpy, $s=s(\psi,\chi)$, is the entropy, T is the temperature, $\rho$ is the density, and $\underline{\Omega}$ is the angular velocity of the frame of reference.

2. A method according to claim 1, wherein the flow through said flow device is an axisymmetric flow, and wherein the step of deriving the geometry comprising deriving geometry using inverse flow equations of the form:

$$\frac{\partial x}{\partial \sigma} = \frac{h^2}{J}\frac{\partial r}{\partial \psi}, \text{ and } \frac{\partial r}{\partial \sigma} = -\frac{h^2}{J}\frac{\partial x}{\partial \psi}, \qquad (1)$$

$$J = \frac{\partial x}{\partial \sigma}\frac{\partial r}{\partial \psi} - \frac{\partial r}{\partial \sigma}\frac{\partial x}{\partial \psi}, \qquad (2)$$

$$h^2 = \left(\frac{\partial x}{\partial \sigma}\right)^2 + \left(\frac{\partial r}{\partial \sigma}\right)^2, \qquad (3)$$

and

-continued $$\frac{dH}{d\psi} - T\frac{ds}{d\psi} - \frac{C}{r^2}\frac{dC}{d\psi} - \frac{1}{\rho rJ}\frac{\partial}{\partial \psi}\left(\frac{h^2}{\rho rJ}\right) = 0, \qquad (4)$$

wherein x and r are cylindrical coordinates.

3. A method according to claim 2, wherein said flow device is at least a part of device selected from the group consisting of a gas turbine, a steam turbine, and a combined gas/steam cycle plant.

4. A method according to claim 1, further comprising the steps of:

specifying the geometry of the flow device according to a first approximation;

determining the static pressure distribution along the specified surface of the flow device by means of a backward computation using said inverse flow equations;

introducing a modified static pressure distribution; and determining a refined geometry of the flow device by means of a forward computation using said inverse flow equations.

* * * * *